(12) United States Patent
Süss et al.

(10) Patent No.: US 8,528,495 B2
(45) Date of Patent: Sep. 10, 2013

(54) DISPLAY DEVICE, IN PARTICULAR FOR A MOTOR VEHICLE

(75) Inventors: Manfred Süss, Remchingen (DE); Martin Mayer, Sinsheim (DE)

(73) Assignee: Johnson Controls Automotive Electronics GmbH, Remchingen (DE)

( * ) Notice: Subject to any disclaimer, the term of this patent is extended or adjusted under 35 U.S.C. 154(b) by 402 days.

(21) Appl. No.: 12/678,722

(22) PCT Filed: Sep. 17, 2008

(86) PCT No.: PCT/EP2008/007766
§ 371 (c)(1),
(2), (4) Date: Jul. 9, 2010

(87) PCT Pub. No.: WO2009/036961
PCT Pub. Date: Mar. 26, 2009

(65) Prior Publication Data
US 2010/0282159 A1    Nov. 11, 2010

(30) Foreign Application Priority Data
Sep. 18, 2007    (DE) .......................... 10 2007 044 665

(51) Int. Cl.
*G01D 11/26*    (2006.01)
*G01D 13/00*    (2006.01)
*B60K 37/02*    (2006.01)

(52) U.S. Cl.
USPC .......................................... 116/305; 116/284

(58) Field of Classification Search
USPC ............... 116/62.1, 62.4, 284, 286, 287, 288, 116/302, 305; 73/431, 866.3
See application file for complete search history.

(56) References Cited

U.S. PATENT DOCUMENTS

| | | | | |
|---|---|---|---|---|
| 3,622,038 A | * | 11/1971 | Wilhelm | ........................ 220/664 |
| 4,128,859 A | * | 12/1978 | Rietmuller | ..................... 362/26 |
| 4,207,768 A | | 6/1980 | Henss | |
| 6,152,066 A | * | 11/2000 | Knoll et al. | ................... 116/288 |
| 2003/0107550 A1 | * | 6/2003 | Tuzar | ............................. 345/156 |
| 2004/0090343 A1 | | 5/2004 | Cassell et al. | |
| 2005/0279273 A1 | | 12/2005 | Pa | |

FOREIGN PATENT DOCUMENTS

| | | | |
|---|---|---|---|
| DE | 10058527 A1 | * | 5/2002 |
| DE | 10105362 A1 | * | 8/2002 |
| DE | 10207777 A1 | * | 9/2003 |

(Continued)

OTHER PUBLICATIONS

International Search Report corresponding to PCT/EP2008/007766, dated Nov. 28, 2008, 2 pages.

(Continued)

*Primary Examiner* — R. A. Smith
(74) *Attorney, Agent, or Firm* — Foley & Lardner LLP

(57) ABSTRACT

A display device for a vehicle includes a front panel and a front frame. The front frame has a front side facing a viewer, and an opposite rear side. The front panel is connected to the front frame. The front frame on the front side and in an encircling fashion in the edge region of the front panel has an aperture edge, the aperture edge being provided substantially parallel to the extent of the front panel. The front panel is connected to the front frame on that side of the aperture edge facing the rear side of the front frame.

6 Claims, 1 Drawing Sheet

(56) References Cited

FOREIGN PATENT DOCUMENTS

| | | | |
|---|---|---|---|
| EP | 1 319 344 A1 | | 6/2003 |
| FR | 2 403 625 | | 4/1979 |
| JP | 2002013953 A | * | 1/2002 |
| JP | 2005181270 A | * | 7/2005 |

OTHER PUBLICATIONS

International Preliminary Examination Report and Written Opinion dated Apr. 15, 2010 as received in corresponding PCT Application No. PCT/EP2008/007766.
Foreign Office Action received in Chinese Patent Application No. 200880107649.6 dated Aug. 1, 2012. (English translation included).

* cited by examiner

DISPLAY DEVICE, IN PARTICULAR FOR A MOTOR VEHICLE

CROSS-REFERENCE TO RELATED APPLICATIONS

This is a National Stage application of PCT/EP2008/007766, filed Sep. 17, 2008, which claims the benefit and priority of German Patent Application No. 10 2007 044 665.0, filed Sep. 18, 2007. The foregoing applications are incorporated by reference herein in their entirety.

The invention relates to a display, in particular a combination instrument or a combination display instrument for a motor vehicle.

Combination instruments with a plurality of display units such as, for example, tachometers, revolution counters, a tank filling level display, are present on the market in numerous configurations. Such combination instruments are generally provided with a front panel which is fitted on that side of the combination instrument pointing into the passenger compartment.

In order to prevent the detectability of objects hidden behind the edge of the front panel, such as electronic components, lines, cables, latching geometry, welding geometry or the like, the sight of which by users could be felt as disturbing, it is known, for example from the French patent publication FR 2 709 708 A1 to provide the front panel with a black strip that is produced from hot-stamping foil, for example, is virtually visually impervious and extends continuously in a circulating fashion along the edge of the front panel.

Starting from this prior art, it is the object of the invention to propose a novel display device that can be produced cost effectively and, in conjunction with a simple design, is configured such that the objects mentioned that are to be concealed from the user's view cannot be detected.

This object is achieved by a display device for a vehicle, in particular a combination display instrument, having a front panel and a front frame, the front frame having a front side facing a viewer, and an opposite rear side, the front panel being connected to the front frame, wherein on its front side and in an encircling fashion in the edge region of the front panel the front frame has an aperture edge, the aperture edge being provided substantially parallel to the extent of the front panel, and the front panel being connected to the front frame on that side of the aperture edge facing the rear side of the front frame. As a result, a frame structure surrounding the front panel and holding the front panel is made available, the frame structure being provided with a masking edge preventing the objects from being viewed. Furthermore, it is hereby advantageously possible for the front panel to be mounted starting from the rear side of the front frame and to be connected to the front frame. The aperture edge, which is also denoted below as masking edge, can hereby mask the edge region of the front panel in a simple way such that a cost intensive hot-stamping foil can be dispensed with.

Furthermore, it is preferred according to the invention that the connection of the front panel to the front frame is provided by means of a mechanical latch, in particular by means of clipping. It is hereby advantageous to be able to provide the mounting of the front panel with the front frame or the connection of both of them in a way that is simple and therefore greatly assists the mounting.

Furthermore, it is preferred that in its edge region the front panel has outwardly projecting at least one clamping element or a latching element, and/or in that the front frame has in the region of the aperture edge at least one clamping element or one latching element. In particular, the clamping element or the latching element can be designed in the form of a protruding projection or a protruding "nose". In particular, the front panel has an edge contour that is, for example, designed to be substantially oval or round or else rectangular with, for example, rounded corners, the projections protruding from this edge contour and being arranged in a mounted state behind the aperture edge or the masking edge such that, in the mounting state, there is no longer present any sort of aesthetic component perceptible to a user of the display device. As an alternative or in addition to forming clamping elements or latching elements on the front panel, in particular ones that protrude outward, according to the invention it is possible to envisage the provision on the front frame of clamping elements or latching elements that cooperate with the edge region of the front panel, and/or cooperate with the clamping elements in the edge region of the front panel and thereby effect clamping, or else latching, or else both clamping and latching.

Moreover, it is also preferred according to the invention that the connection of the front panel to the front frame is provided by means of a welded joint on that side of the aperture edge facing the rear side of the front frame. It is hereby possible to produce in a way that is simple, cost-effective and reliable in terms of production engineering the connection between the front frame and the front panel that is stable throughout service life and, in particular, can also fulfill further requirements such as, for example, imperviousness to dust and/or imperviousness to moisture. According to the invention, laser welding, in particular, takes place, the laser beam required for laser welding being, in particular, guided to the weld zone through the front panel. It is also important that, at least in the region of its side averted from the weld zone, the front panel has no property that reduces the passage of light, for example a tint or an opaque covering.

It is also preferred according to the invention for the front panel to have a substantially equal optical transparency over its entire surface. This means, in particular, that there is no need to fit on the front panel a hot-stamping foil that causes the optical transparency to vary in parts of the front panel as against other parts of the front panel. It is thereby advantageously possible according to the invention to economize on comparatively high costs for such a hot-stamping foil.

A further object of the present invention relates to a method for producing a display device for a vehicle, in particular an inventive display device, wherein a front panel and a front frame are connected to one another in order to produce the display device, the front frame having a front side facing a viewer and an opposite rear side, the front panel being connected to the front frame from the rear side thereof. It is hereby advantageously possible for the masking edge or the aperture edge of the front frame to be arranged in front of the front panel out of sight of the viewer in the installed state of the display device, such that the masking edge serves as aperture, and it is therefore possible to dispense with the hot-stamping foil.

It is preferred in the inventive method when the front panel is mechanically latched to the front frame. Easy and simple mounting is hereby possible in accordance with the invention, and so the mounting costs can be reduced.

Furthermore, it is preferred in the case of the inventive method that the front panel is welded, in particular laser welded, to the front frame, it being very particularly preferred to make use of a laser welding method in which the front panel is welded to the front frame from the rear side (of the front frame) through the front panel and by heating the connecting surface between the front panel, on the one hand, and the aperture edge or the masking edge, on the other hand.

Exemplary embodiments of the invention are illustrated in the drawing and explained in more detail in the following description—which is to be interpreted purely as an example.

Figure 1:
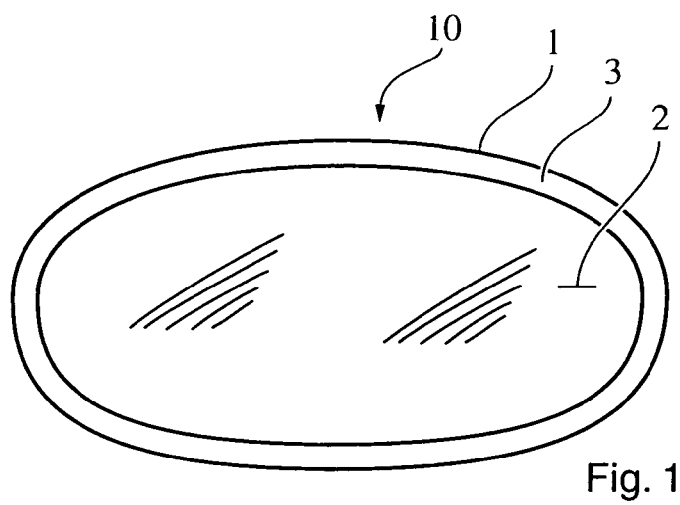
FIG. 1 shows in a purely schematic illustration a front frame that is provided for a combination display instrument and to which the front panel is connected.

FIG. 1 shows in a purely schematic illustration a front frame 1 that is provided on a display device 10, in particular a combination instrument or a combination display instrument and which is used to mount a front panel 2.

Figure 2:
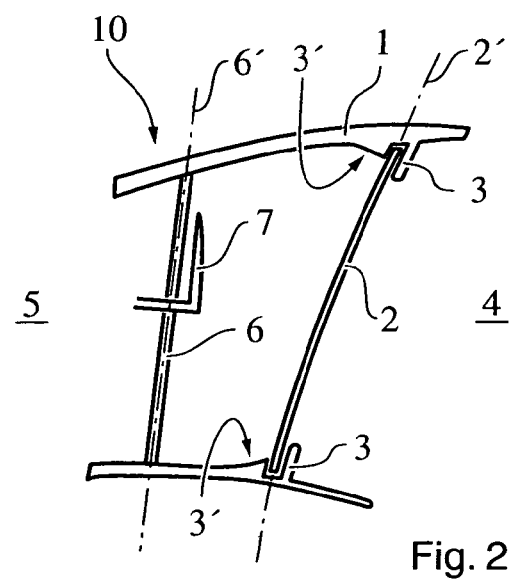
FIG. 2 shows in a likewise schematic illustration a sectional illustration parallel to the viewing direction through a combination display instrument.

FIG. 2 shows in a likewise schematic illustration a sectional illustration parallel to the viewing direction through a display device 10 or a combination display instrument.

The two figures are described together below. The front frame 1 is provided with an inwardly overhanging masking edge 3. At least over a substantial part of its (radial) profile, the masking edge or the aperture edge 3 is formed in a fashion substantially parallel to the direction in which the front panel 2 extends. A particularly good aperture effect is hereby attained by the masking edge 3. The front panel 2 is mounted from the rear (that is to say from the side averted from the user in the installed state), in particular the front panel 2 is clipped into the front frame 1 (by means of a schematically indicated clamping element or latching element 3'), and rests on the masking edge 3 in the mounted state. Alternatively or in addition, the welded joint, in particular a laser welded joint, can be provided according to the invention between the rear side of the masking edge 3 and the front side of the front panel 2 in its edge region.

According to the invention, the front frame 1 is in particular embodied, in particular, as a front frame 1 of extractable or tubular type such that the plane 2' or the region of the front panel 2 can be displaced or arranged further in the direction toward a viewer of the display device with respect to a plane 6' or a region of a display surface 6 (for example, a mechanically movable pointer 7, or else a display device [not illustrated] such as, for example, an LCD display or another type of display such as, for example, an OLED display).

For example, in the mounted state the front panel 1 bears with the edge of its front surface facing toward the front, facing the user, against the outward pointing rear surface of the masking edge 3.

By way of example, the front frame 1 is produced by the injection molding method. Furthermore, by way of example the front frame 1 and the masking edge 3 are produced by the injection molding method, it being possible, in particular, for the masking edge to be integrally formed in one piece on the front frame and already to be taken into account in the injection molding die.

By way of example, the masking edge 3 projecting from the inner periphery of the front frame 1 extends continuously over the entire inner periphery of the front frame 1.

In principle, the masking edge 3 can be configured as desired and, of course, also as a delimiting wall that delimits toward the front a folding groove that is provided on the front frame and into which the front panel engages with its edge. In this case, the holding groove extends, by way of example, continuously along the entire inner periphery of the front frame.

LIST OF REFERENCE NUMERALS

1 Front frame
2 Front panel
2' Plane of the front panel
3 Masking edge/aperture edge
3' Clamping element/latching element
4 Front side
5 Rear side
6 Display surface
6' Plane of the display surface
7 Pointer
10 Display device

The invention claimed is:

1. A display device for a vehicle, the display device comprising:
   a front panel; and
   a front frame, the front frame having a front side facing a viewer, and an opposite rear side,
   wherein the front panel is connected to the front frame,
   wherein the front frame on the front side and in an encircling fashion in the edge region of the front panel has an aperture edge, the aperture edge being provided substantially parallel to the extent of the front panel, and the front panel being connected to the front frame on a side of the aperture edge facing the rear side of the front frame,
   wherein a welded joint connects the front panel to the front frame and the welded joint is on the side of the aperture edge facing the rear side of the front frame.

2. The display device as claimed in claim 1, further comprising a mechanical latch that connects the front panel to the front frame.

3. The display device as claimed in claim 2, wherein the edge region of the front panel has outwardly projecting at least one clamping element or a latching element, and/or the front frame has in the region of the aperture edge at least one clamping element or one latching element.

4. The display device as claimed in claim 1, wherein over its entire surface the front panel has a substantially equal optical transparency.

5. A method for producing a display device for a vehicle, comprising:
   connecting a front panel and a front frame to one another, the front frame having a front side facing a viewer and an opposite rear side,
   wherein the front frame on the front side and in an encircling fashion in the edge region of the front panel has an aperture edge, the aperture edge being provided substantially parallel to the extent of the front panel,
   wherein the front panel is connected to the front frame from the rear side thereof and on a side of the aperture edge facing the rear side of the front frame, and
   wherein the front panel is welded to the front frame and the welded joint is on the side of the aperture edge facing the rear side of the front frame.

6. The method as claimed in claim 5, further comprising mechanically latching the front panel to the front frame.

* * * * *